United States Patent
Engeldinger

(10) Patent No.: US 11,851,549 B2
(45) Date of Patent: Dec. 26, 2023

(54) TIRE

(71) Applicant: The Goodyear Tire & Rubber Company, Akron, OH (US)

(72) Inventor: Eric Engeldinger, Redange/Attert (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 459 days.

(21) Appl. No.: 17/080,961

(22) Filed: Oct. 27, 2020

(65) Prior Publication Data

US 2021/0139678 A1     May 13, 2021

Related U.S. Application Data

(60) Provisional application No. 62/933,690, filed on Nov. 11, 2019.

(51) Int. Cl.
| | | |
|---|---|---|
| *C08L 15/00* | (2006.01) | |
| *B60C 1/00* | (2006.01) | |
| *B60C 11/00* | (2006.01) | |
| *C08L 9/00* | (2006.01) | |

(52) U.S. Cl.
CPC ............ *C08L 15/00* (2013.01); *B60C 1/0016* (2013.01); *B60C 11/005* (2013.01); *B60C 11/0008* (2013.01); *C08L 9/00* (2013.01); *C08L 2205/035* (2013.01); *C08L 2205/06* (2013.01); *C08L 2207/322* (2013.01)

(58) Field of Classification Search
CPC ...... C08L 15/00; C08L 9/00; C08L 2205/035; C08L 2205/06; C08L 2207/322; B60C 1/0016; B60C 11/0008; B60C 11/005
See application file for complete search history.

(56) References Cited

U.S. PATENT DOCUMENTS

| | | | |
|---|---|---|---|
| 4,898,223 A | 2/1990 | Botzman et al. | |
| 5,430,084 A | 7/1995 | Sandstrom et al. | |
| 6,651,716 B1 | 11/2003 | Brown et al. | |
| 7,629,409 B2 | 12/2009 | Kanz et al. | |
| 2008/0076867 A1* | 3/2008 | Kanz | C08K 3/34 |
| | | | 524/262 |
| 2008/0114108 A1 | 5/2008 | Frank et al. | |
| 2012/0123018 A1 | 5/2012 | Kanz et al. | |
| 2013/0153099 A1* | 6/2013 | Schweitzer | B60C 1/0016 |
| | | | 152/209.1 |
| 2017/0233545 A1* | 8/2017 | Tsuchida | C08L 9/06 |
| | | | 523/155 |
| 2019/0062529 A1* | 2/2019 | Isitman | C08K 3/36 |
| 2019/0185643 A1* | 6/2019 | Mori | C08F 36/08 |

FOREIGN PATENT DOCUMENTS

| | | |
|---|---|---|
| CN | 101148521 A | 4/2008 |
| CN | 106661279 A | 5/2017 |
| CN | 107075183 A | 8/2017 |
| EP | 1902865 A1 | 3/2008 |
| EP | 1932688 A1 | 6/2008 |
| EP | 2179865 B1 | 9/2009 |
| EP | 2455232 B1 | 11/2011 |

OTHER PUBLICATIONS

Chinese Office Action dated Sep. 5, 2022 for Chinese Patent Application No. 202011254779.1 which is the Chinese counterpart to the subject patent application.
Search Report for Brazilian Patent Application BR1020022764-8 dated Jul. 18, 2023 which is a counterpart to the subject patent application.

* cited by examiner

*Primary Examiner* — Angela C Scott
(74) *Attorney, Agent, or Firm* — Alvin T. Rockhill

(57) ABSTRACT

The present invention is directed a tire comprising two rubber components which are co-cured together. The first rubber component comprises from 70 phr to 100 phr of a hydrogenated styrene butadiene rubber, 0 phr to 15 phr of a polybutadiene, 5 phr to 20 phr of a polyoctenamer, and 40 phr to 160 phr of a first filler. The second rubber component comprises 90 phr to 100 phr of a diene-based elastomer; and 20 phr to 160 phr of a second filler. Moreover, the present invention is directed to a rubber composition comprising a hydrogenated styrene butadiene rubber, 5 phr to 20 phr of a polyoctenamer, and 40 phr to 160 phr of a reinforcing filler.

20 Claims, No Drawings

TIRE

This application claims benefit of U.S. Provisional Patent Application Ser. No. 62/933,690, filed on Nov. 11, 2019. The teachings of U.S. Provisional Patent Application Ser. No. 62/933,690 are incorporated herein by reference in their entirety.

FIELD OF THE INVENTION

This invention relates to a tire comprising a first rubber component which is co-cured to a second rubber component, wherein the first rubber component has a different composition than the second rubber component. Moreover, the present invention relates to a rubber composition.

BACKGROUND OF THE INVENTION

In view of a continuing demand for improved tire performance, new material combinations are constantly being evaluated and tested by tire manufacturers. For instance, tensile properties and resistance to oxidative degradation could be improved by the use of hydrogenated styrene butadiene rubbers compared to a standard diene polymer, in particular in tread compounds. However, co-curability to non-hydrogenated rubbers, such as polybutadiene rubber, styrene-butadiene rubber (SBR), synthetic polyisoprene rubber, and natural rubber, may be limited. As a consequence of reduced co-curability, the rubber component comprising such a hydrogenated styrene-butadiene rubber may not adhere well to non-hydrogenated rubber components which can lead to delamination. In tires and other rubber products this results in reduced tear strength and adversely affects the service life of the rubber product. This problem associated with reduced co-curability is of particular concern in cases where such hydrogenated styrene-butadiene rubbers are used in tire tread compounds by virtue of the substantially reduced tire tread life the consequently results.

SUMMARY OF THE INVENTION

A first object of the present invention may be to provide an advanced tire with rubber components strongly cured to each other. For instance, such a tire could include a tread or a sidewall which is comprised a hydrogenated styrene-butadiene rubber and one or more additional rubbers which have not been hydrogenated, such as high-cis-1,4-polybutadiene rubber, styrene-butadiene rubber (SBR), synthetic polyisoprene rubber, and natural rubber. Another object of the present invention may be to provide an advanced tire with improved rolling resistance and a reduced level of hysteresis (heat generation during operation). Such a tire would provide better fuel economy for the vehicle on which it was installed.

Another object of the present invention may be to provide an advanced tire having a tread which provides reduced rolling resistance, a lower level of heat generation during use, and better fuel economy via a lower level of hysteresis.

Another object of the present invention may be to provide a tire having good tensile properties and/or advanced durability and wear resistance (improved tread-wear for an extended tire service life).

Thus, in a first aspect of the invention, a tire comprises a first rubber component and a second rubber component, wherein the first rubber component is cured (co-cured) to the second rubber component, and wherein the first rubber component comprises from 70 phr to 100 phr of a hydrogenated styrene butadiene rubber, in particular a solution polymerized styrene butadiene rubber (SSBR), from 0 phr to 15 phr of a polybutadiene, from 5 phr to 20 phr of a polyoctenamer, and from 40 phr to 160 phr of a first filler. The second rubber component comprises from 90 phr to 100 phr of a diene-based elastomer, and from 20 phr to 160 phr of a second filler. The second rubber will typically be a non-hydrogenated diene rubber, such as high-cis-1,4-polybutadiene rubber, medium vinyl-polybutadiene rubber, styrene-butadiene rubber (SBR), styrene-isoprene-butadiene rubber, synthetic polyisoprene rubber, or natural rubber. The inventors have discovered that the polyoctenamer surprisingly improves the co-curability of the first rubber component comprising the hydrogenated SSBR with another diene-based rubber. At the same time, the level of hysteresis exhibited is reduced. A reduced level of hysteresis is indicative of reduced tire rolling resistance which ultimately leads to better vehicle fuel economy.

In one embodiment of the present invention, the first rubber component comprises from 95 phr to 100 phr of the hydrogenated styrene butadiene rubber and from 0 phr to 5 phr of the polybutadiene. The inventors have found out that a lower amount of polybutadiene is even more desirable as a preferred embodiment of the present invention. Even more preferably, the compound could comprise 100 phr of the hydrogenated SSBR.

Hydrogenated solution styrene-butadiene rubber (HSSBR) which is suitable for use in the practice of this invention can be made by hydrogenating conventional solution styrene-butadiene rubber. Such a hydrogenation can be carried out in an inert organic solvent by homogeneous or heterogeneous activation of molecular hydrogen with various metal catalysts, such as platinum, palladium, or nickel. More specifically, the SSBR is reacted with hydrogen (H2) in the presence of the metal catalyst in a suitable organic solvent. Transition metal catalysts are widely used to catalyze such hydrogenations in large scale commercial production. In the case of costly noble metal catalysts their removal, recovery and reuse is required for the hydrogenation to be an economically viable process. In the case of solution styrene-butadiene rubber virtually any hydrogenation catalyst is suitable. The hydrogenation of SSBR is well known to persons having ordinary skilled in the art and is described in United States Patent Application Publication Number 2018/0201065 A1, United States Patent Application Publication Number 2018/0251576 A1 and United States Patent Application Publication Number 2019/0062539 A1. The teaching of United States Patent Application Publication Number 2018/0201065 A1, United States Patent Application Publication Number 2018/0251576 A1 and United States Patent Application Publication Number 2019/0062539 A1 are incorporated herein by reference for the purpose of describing techniques of making hydrogenated solution styrene-butadiene rubber and the hydrogenated solution styrene-butadiene rubbers made utilizing such techniques.

In another embodiment, the first rubber component includes from 5 phr to 15 phr of the polyoctenamer. Such amounts have been found to be most preferable.

In still another embodiment, the diene-based elastomer (of the second rubber component) comprises polyisoprene rubber or polybutadiene rubber (such as high cis-1,4-polybutadiene rubber), or a combination thereof.

In yet another embodiment, the tire has a tread, wherein the first component and the second component are components of the tread. Alternatively, the second rubber component could be a sidewall, wherein the sidewall is cured to the tread in an axially outer portion of the tread.

In still another embodiment, the first rubber component is a tread cap layer of the tread, and the second rubber component is a second tread cap layer or a tread base layer of the tread. The first rubber component may be cured to the second rubber component essentially along a cylindrical plane extending along the circumferential direction of the tire.

In still another embodiment, the hydrogenated SSBR has less than 5%, preferably less than 2%, of unhydrogenated vinyl groups, based on the total number of vinyl groups and ethyl groups in the hydrogenated SSBR.

In still another embodiment, the hydrogenated SSBR has less than 5%, or less than 2%, or even less than 1%, of double bonds along its main chain (excluding styrene groups, vinyl groups, ethyl groups and other sidechain groups), based on the total number of bonds along the chain. In some cases, the hydrogenated SSBR will be 60% to 99% hydrogenated, 70% to 99% hydrogenated, 90% to 99% hydrogenated. In another preferred embodiment, the hydrogenated styrene butadiene rubber has from 90% to 98% hydrogenated double bonds. In other words, there are still double bonds remaining which have not been hydrogenated. In general, styrene groups or any cyclic groups shall not be counted for the purpose of determination of the number of bonds or double bonds in the present case. As known to the person skilled in the art, the number of double bonds can be determined by NMR.

In still another embodiment, the second rubber component comprises from 30 phr to 90 phr polyisoprene, from 10 phr to 70 phr polybutadiene, from 30 phr to 70 phr of a filler, in particular carbon black and/or silica. For example, this may be the composition of a base compound. The polyisoprene can be natural rubber or synthetic polyisoprene rubber. The polybutadiene rubber will typically be high cis-1,4-polyisoprene rubber having a cis-microstructure content of at least 95%.

In another embodiment, the first component comprises from 60 to 80 phr silica.

In still another embodiment, the polybutadiene has a glass transition temperature in a range from −90° C. to −115° C., preferably from −90° C. to −110° C.

In yet another embodiment, the hydrogenated styrene butadiene rubber has a glass transition temperature in the range of −20° C. to −50° C.

In yet another embodiment, the bound styrene content of the styrene-butadiene rubber will be within the range of 10% to 40% and its bound butadiene content will be within the range of 60% to 90%, by weight, as determined by NMR. The styrene-butadiene rubber will typically have a bound styrene content which is within the range of 25% to 35% and a bound butadiene content which is within the range of 65% to 75%. The styrene-butadiene rubber will more typically have a bound styrene content which is within the range of 25% to 30% and a bound butadiene content which is within the range of 70% to 75%.

In yet another embodiment, the first rubber component comprises from 15 phr to 40 phr of plasticizers including between 5 phr and 25 phr of an oil and 5 phr to 20 phr of a resin.

In a preferred embodiment, the first compound includes a resin at a level which is within the range of 5 phr to 20 phr, wherein the resin may optionally be a hydrocarbon resin, preferably an alpha pinene based resin.

In still another preferred embodiment, the ratio of resin to oil is within the range of about 1:1 phr to 1:4 phr. Even more preferably, the ratio of resin to oil is within the range of about 1:1.5 phr to 1:3 phr.

In another preferred embodiment, the polyoctenamer has one or more of: a glass transition temperature which are within the range of −50° C. to −80° C.; a weight average molecular weight ($M_w$) which is within the range of 80,000 to 100,000, as determined by GPC; and a melting point with is within the range of 45° C. to 55° C. as measured by DSC in second heating in according to ASTM D3418.

In yet another preferred embodiment, the polyoctenamer has within the range of 65% to 85% trans double bonds, based upon the total number of double bonds in the polyoctenamer.

In another aspect of the present invention, a rubber composition is provided, which is comprised of (or in other words comprises) a hydrogenated styrene-butadiene rubber, 5 phr to 20 phr of a polyoctenamer, and 40 phr to 160 phr of a reinforcing filler.

In one embodiment, the rubber composition is further comprised of 5 phr to 15 phr of high cis-polybutadiene rubber having a cis-microstructure content of at least 95%.

In another embodiment, the rubber composition is further comprised of 5 phr to 25 phr of an oil and 5 phr to 15 phr of a resin.

In yet another embodiment, the resin is an alpha pinene based resin.

In still another embodiment, the hydrogenated styrene-butadiene rubber has one or more of: (i) less than 5% of nonhydrogenated vinyl groups, based on the total number of vinyl groups and ethyl groups of the hydrogenated styrene butadiene rubber; (ii) less than 2% of double bonds along its main chain, based on the total number of bonds along the main chain, excluding number of bonds in styrene groups, vinyl groups, ethyl groups and other sidechain groups of the styrene butadiene rubber; and (iii) from 90% to 99% hydrogenated double bonds.

While some embodiments of the rubber composition have been provided explicitly above, all features of the rubber composition mentioned already in connection with the (first) rubber composition of the tire may also be present in the rubber composition described separately in the present aspect.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from 1,3-butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers which are not hydrogenated. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In another embodiment, an emulsion polymerization derived styrene/butadiene (ESBR) might be used having a styrene content of 20 to 35 percent bound styrene or, for some applications, an ESBR having a medium to relatively high bound styrene content, namely, a bound styrene content of 30 to 45 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 weight percent to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50, preferably 9 to 36, percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator.

In one embodiment, a synthetic or natural polyisoprene rubber may be used. Synthetic cis-1,4-polyisoprene and cis-1,4-polyisoprene natural rubber are as such well known to those having skill in the rubber art. In particular, the cis-1,4-microstructure content may be at least 90%, optionally at least 95%.

In one embodiment, cis 1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis 1,4-content ("high cis" content) and a glass transition temperature Tg in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer or elastomer composition, where referred to herein, represents the glass transition temperature(s) of the respective elastomer or elastomer composition in its uncured state or possibly a cured state in the case of an elastomer composition. A Tg can be suitably determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 to 10 phr, optionally from 1 to 5 phr, of one or more additional diene-based rubbers, such as SBR, SSBR, ESBR, PBD/BR, NR and/or synthetic polyisoprene. In another example, the composition may include less than 5, preferably less than 3, phr of an additional diene-based rubber or be also essentially free of such an additional diene-based rubber. The terms "compound" and "composition" may be used herein interchangeably, unless indicated otherwise.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, triglyceride oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. The triglyceride oils that can be used include vegetable oils, including but not limited to vegetable oils, soybean oil, canola oil (Rapeseed oil), corn oil, cottonseed oil, olive oil, palm oil, safflower oil, sunflower oil, coconut oil, and peanut oil.

In an embodiment, the rubber composition may include silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area as measured using nitrogen gas. In one embodiment, the BET surface area may be in the range of 40 $m^2/g$ to 600 $m^2/g$ (square meters per gram). In another embodiment, the BET surface area may be in a range of 80 $m^2/g$ to 300 $m^2/g$. The BET method of measuring surface area is described in the Journal of the American Chemical Society, Volume 60, Page 304 (1930). The conventional silica may also be characterized by having a dibutylphthalate (DBP) absorption value in a range of 100 to 400, alternatively 150 to 300. A conventional silica might be expected to have an average ultimate particle size, for example, in the range of 0.01 to 0.05 micron as determined by the electron microscope, although the silica particles may be even smaller, or possibly larger, in size. The level of silica use can be within the range of 5 phr to 120 phr, preferably in a range of 20 phr to 70 phr or 80 phr to 120 phr. Various commercially available silicas may be used, such as, only for example herein, and without limitation, silicas commercially available from PPG Industries under the Hi-Sil trademark with designations 210, 315G, EZ160G, etc; silicas available from Solvay, with, for example, designations of Z1165MP and Premium200MP, etc. and silicas available from Evonik AG with, for example, designations VN2 and Ultrasil 6000GR, 9100GR, etc.

In an embodiment, the rubber composition may include also carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 cm$^3$/100 g to 150 cm$^3$/100 g.

In another embodiment, other fillers may be used in the rubber composition including, but not limited to, particulate fillers including ultra-high molecular weight polyethylene (UHMWPE), crosslinked particulate polymer gels including but not limited to those disclosed in U.S. Pat. Nos. 6,242,534, 6,207,757, 6,133,364, 6,372,857, 5,395,891 and 6,127,488, and a plasticized starch composite filler including but not limited to that disclosed in U.S. Pat. No. 5,672,639. The teachings of U.S. Pat. Nos. 6,242,534, 6,207,757, 6,133,364, 6,372,857, 5,395,891, 6,127,488, and 5,672,639 are incorporated by reference herein. Such other fillers may be used in an amount which is within the range of 1 phr to 10 phr.

In one embodiment, the rubber composition may contain a conventional sulfur containing organosilicon compounds or silanes. Examples of suitable sulfur containing organosilicon compounds are of the formula:

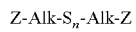

in which Z is selected from the group consisting of

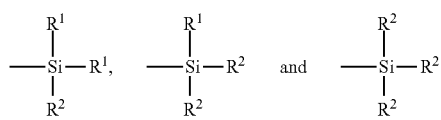

where R$^1$ is an alkyl group of 1 to 4 carbon atoms, cyclohexyl or phenyl; R$^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

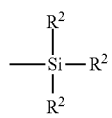

where R$^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials. In another embodiment, suitable sulfur containing organosilicon compounds include those disclosed in United States Patent Application Publication No. 2003/0130535 which is now issued as U.S. Pat. No. 6,849,754 B2. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders, and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5, phr. In another embodiment, combinations of a primary and a secondary accelerator might be used with the secondary accelerator being used in smaller amounts, such as from 0.05 phr to 3 phr, in order to activate and to improve the properties of the vulcanizate.

Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature which is within the range of 140° C. to 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire (or in other words tire components). For example, the rubber component may be a tread (including tread cap and tread base), sidewall, apex, chafer, sidewall insert, wirecoat or innerliner.

The tire of the present invention may for example be a pneumatic tire or nonpneumatic tire, a race tire, a passenger tire, an aircraft tire, an agricultural tire, an earthmover tire, an off-the-road (OTR) tire, a truck tire or a motorcycle tire. The tire may also be a radial or bias tire. Vulcanization of the pneumatic tire of the present invention may for instance be carried out at conventional temperatures which are within the range of 100° C. to 200° C. In one embodiment, the vulcanization is conducted at a temperature which is within the range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Multiple features of the aspects and embodiments mentioned herein may be combined with one another.

DETAILED DESCRIPTION OF AN EMBODIMENT OF THE INVENTION

Below Table 1 shows rubber compositions for a first rubber compound. Control 1 and the Inventive Example 1 comprise a hydrogenated SSBR. However, only Inventive Example 1 comprises a polyoctenamer in accordance with a nonlimiting example of the present invention. The second control sample, Control 2, comprises a non-hydrogenated SSBR blended with a polybutadiene, in the absence of polyoctenamer.

TABLE 1

| Material | First Compound (phr) | | |
|---|---|---|---|
| | Control 1 | Inventive Example 1 | Control 2 |
| Hydrogenated SSBR[1] | 100 | 100 | 0 |
| SSBR[2] | 0 | 0 | 80 |
| Polybutadiene[3] | 0 | 0 | 20 |
| Resin[4] | 7 | 7 | 7 |
| Waxes | 1.5 | 1.5 | 1.5 |
| Antioxidants | 2.5 | 2.5 | 2.5 |
| Oil[5] | 14 | 14 | 14 |
| Stearic Acid | 3 | 3 | 3 |
| Silica[6] | 80 | 80 | 80 |
| Polyoctenamer[7] | 0 | 10 | 0 |
| Silane[8] | 8 | 8 | 8 |
| Zinc oxide | 2.5 | 2.5 | 2.5 |
| Sulfur | 1.5 | 1.5 | 1.5 |
| Accelerator | 2.5 | 2.5 | 2.5 |
| DPG | 3 | 3 | 3 |
| Carbon black | 2 | 2 | 2 |

[1]Hydrogenated solution polymerized styrene butadiene rubber having a glass transition temperature of about −30° C.
[2]Solution polymerized styrene butadiene rubber having a glass transition temperature of −23° C. and a microstructure of 21% styrene, 63 BD % vinyl. as Sprintan™ SLR-4602 of the company Trinseo
[3]Polybutadiene having a glass transition temperature of −105° C.
[4]Alpha-pinene based resin
[5]TDAE oil
[6]HDS Silica having a BET surface area of 200
[7]Vestenamer™ 8012 of the company Evonik
[8]SI266™ of the company Evonik The compositions as given above in Table 1 were included in a tread cap layer and co-cured to a tread base layer having as a non-limiting example the composition given in Table 2 below.

TABLE 2

| Material | Second Compound (phr) |
|---|---|
| Polybutadiene[3] | 35 |
| Natural Rubber | 65 |
| Carbon Black | 45 |
| Waxes | 1.5 |
| Antioxidants | 2.5 |
| Resin | 2 |
| Stearic acid | 1.5 |
| Accelerator | 2.5 |
| Zinc oxide | 2.5 |
| Sulfur | 2 |

Properties of Control 1, Control 2 and Inventive Example 1 were determined as shown in Table 3. The tear strengths of the samples Control 1, Control 2 and the Inventive Example 1 to the Second Compound as given in Table 2 are shown in the first line of Table 3. The tear strength is relatively high for the compound Control 2 while Control 1 has a significantly lower tear strength to the base compound. In other words, it is easier to tear off or separate the Control 1 compound comprising the hydrogenated SSBR from the Second Compound as given in Table 2. Remarkably, the addition of the polyoctenamer as present in the Inventive Example 1 improves the tear strength behavior despite the use of the hydrogenated SSBR. The rebound values, which are indicators for the hysteresis behavior of the compounds and thus also for the expected rolling resistance, are also slightly but clearly improved for Inventive Example 1 compared to the control samples. Shore A hardness also remains at a comparable level to the control samples. Finally, and as mentioned before, the presence of the hydrogenated SSBR in Control 1 and Inventive Example 1 results in a remarkable increase in tensile strength compared to Control 2 which is larger than 50%. Inventive Example 1 can at least maintain the level of tear strength to the base or in other words allows still a good co-curability. Hysteresis behavior is also improved.

TABLE 3

|  | First Compound | | |
| --- | --- | --- | --- |
| Property | Control 1 | Inventive Example 1 | Control 2 |
| Tear strength to base [N/mm] [a] | 5.4 | 8.4 | 8.7 |
| Rebound 0° C. [%] [b] | 10.5 | 13.2 | 10.6 |
| Rebound 60° C. [%] [b] | 58.1 | 61.1 | 58.4 |
| Shore A hardness [c] | 72.3 | 70.8 | 67.8 |
| Tensile Strength [MPa] [d] | 31.6 | 29.0 | 18.0 |

[a] Tear propagation test according to DIN 53539.
[b] Rebound measured on a Zwick Roell ™ 5109 rebound resilience tester according to DIN 53512 at the given temperature.
[c] Shore A hardness measured according to ASTM D2240.
[d] Determined by a ring sample test based on ASTM D412; tensile strength is stress at break.

While certain representative embodiments and details have been shown for the purpose of illustrating the subject invention, it will be apparent to those skilled in this art that various changes and modifications can be made therein without departing from the scope of the subject invention.

What is claimed is:

1. A tire comprising a first rubber component and a second rubber component, wherein the first rubber component is cured to the second rubber component, and wherein the first rubber component comprises:
   85 phr to 100 phr of a hydrogenated solution polymerized styrene butadiene rubber;
   0 phr to 15 phr of a polybutadiene rubber;
   5 phr to 20 phr of a polyoctenamer;
   40 phr to 160 phr of a first filler, wherein the first filler is silica; and
wherein the second rubber component comprises:
   90 phr to 100 phr of at least one diene-based elastomer; and
   20 phr to 160 phr of a second filler, wherein the second filler is carbon black.

2. The tire of claim 1, wherein the first rubber component comprises from 95 to 100 phr of the hydrogenated solution polymerized styrene-butadiene rubber and from 0 phr to 5 phr of the polybutadiene rubber.

3. The tire of claim 1, wherein the first rubber component comprises from 5 phr to 15 phr of the polyoctenamer.

4. The tire of claim 1, wherein the diene-based elastomer comprises polyisoprene rubber or polybutadiene rubber, or a combination thereof.

5. The tire of claim 1, wherein the tire has a tread and wherein the first rubber component and the second rubber component are components of the tread.

6. The tire of claim 5, wherein the first rubber component is a tread cap layer of the tread, and wherein the second rubber component is a second tread cap layer or a tread base layer of the tread.

7. The tire of claim 5, wherein the first rubber component is cured to the second rubber component essentially along a cylindrical plane extending along the circumferential direction of the tire.

8. The tire of claim 1, wherein the hydrogenated solution polymerized styrene-butadiene rubber has one or more of:
   i) less than 5% of nonhydrogenated vinyl groups, based on the total number of vinyl groups and ethyl groups of the hydrogenated styrene butadiene rubber;
   ii) less than 2% of double bonds along its main chain, based on the total number of bonds along the main chain, excluding number of bonds in styrene groups, vinyl groups, ethyl groups and other sidechain groups of the styrene butadiene rubber; and
   iii) from 90% to 99% hydrogenated double bonds.

9. The tire of claim 1, wherein the second rubber component comprises
   from 30 phr to 90 phr polyisoprene rubber;
   from 10 phr to 70 phr polybutadiene rubber;
   from 30 phr to 70 phr carbon black.

10. The tire of claim 1, wherein the first rubber component comprises from 60 to 80 phr of silica.

11. The tire of claim 1, wherein the hydrogenated solution polymerized styrene-butadiene rubber has a bound styrene content ranging from 20% to 35% and a butadiene content ranging from 50% to 80%, by weight.

12. The tire of claim 1, wherein the first rubber component comprises 15 phr to 30 phr of plasticizers including between 5 phr and 25 phr of an oil and 5 phr to 15 phr of a resin.

13. The tire of claim 12, wherein the resin is an alpha pinene based resin.

14. The tire of claim 12, wherein the ratio of resin to oil is within the range of 1:1 phr to 1:4 phr.

15. The tire of claim 1, wherein the polyoctenamer has one or more of: a glass transition temperature in a range from −50° C. to −80° C.; a weight average molecular weight which is within the range of 80,000 to 100,000 as determined by GPC; and a melting point which is within the range of 45° C. to 55° C. as measured by DSC in a second heating.

16. The tire of claim 1, wherein the polyoctenamer has a trans-microstructure content which is within the range of 65% to 85%.

17. A tire comprising a first rubber component and a second rubber component, wherein the first rubber component is cured to the second rubber component, and wherein the first rubber component consists of: 85 phr to 100 phr of a hydrogenated solution polymerized styrene butadiene rubber, 0 phr to 15 phr of a polybutadiene rubber, 5 phr to 20 phr of a polyoctenamer, 40 phr to 160 phr of silica, 1 phr to 10 phr of carbon black, 5 phr to 15 phr of an alpha pinene based resin, optionally oils, optionally plasticizers, optionally pigments, optionally fatty acids, optionally zinc oxide, optionally waxes, optionally antioxidants, and optionally antiozonants; and wherein the second rubber component comprises: 90 phr to 100 phr of at least one diene-based elastomer, and 20 phr to 160 phr of a second filler, wherein the second filler is carbon black.

18. A rubber composition which is comprised of a hydrogenated solution polymerized styrene butadiene rubber, 5 phr to 20 phr of a polyoctenamer, and 40 phr to 160 phr of silica.

19. The rubber composition of claim 18 wherein the rubber composition is further comprised of 5 phr to 15 phr of high cis-polybutadiene rubber having a cis-microstructure content of at least 95%, 5 phr to 25 phr of an oil, and 5 phr to 15 phr of a resin.

20. The rubber composition of claim 19 wherein the resin is an alpha pinene based resin.

\* \* \* \* \*